J. A. CHARTER.
WHEEL.
APPLICATION FILED JAN. 24, 1920.

1,361,227.

Patented Dec. 7, 1920.

Inventor:
James A. Charter,
By Cheever & Cox
Attys.

UNITED STATES PATENT OFFICE.

JAMES A. CHARTER, OF CHICAGO, ILLINOIS.

WHEEL.

1,361,227. Specification of Letters Patent. Patented Dec. 7, 1920.

Application filed January 24, 1920. Serial No. 353,728.

*To all whom it may concern:*

Be it known that I, JAMES A. CHARTER, a citizen of the United States, residing at Chicago, in the county of Cook and State of Illinois, have invented a certain new and useful Improvement in Wheels, of which the following is a specification.

This invention relates to wheels, particularly metallic spokeless wheels. The objects of the invention are: to provide mechanism by which standardized hubs and rims may be used in a wheel of this class, to provide a very light strong and rigid wheel at a minimum expense which is rivetless and boltless and without joints when completed and so practically water and air tight,—therefore internally rustless—and therefore practically indestructible. A further object is to provide a wheel of this class which in the process of manufacture can be built up and welded by successively assembling the parts one after the other, with the wheel in one position,—that is to say, without its being necessary to lift and reverse any of the parts as is required in prior structures, thereby saving considerable expense in power, labor, and speed of construction.

The invention consists in mechanism for carrying out the foregoing objects, which can be easily and cheaply made, which is satisfactory in operation, and is not liable to get out of order. More particularly the invention consists in the features and details of construction more fully set forth in the specification and claims.

Figure 1:
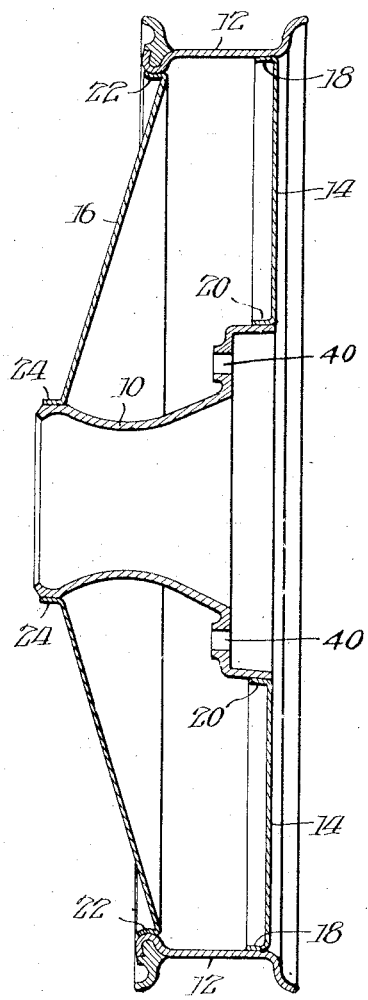

Referring to the drawings in which like numerals denote like parts throughout the several views, Figure 1 is a central sectional view of a wheel of this construction, illustrating one of the preferred forms of the invention.

Figure 2:
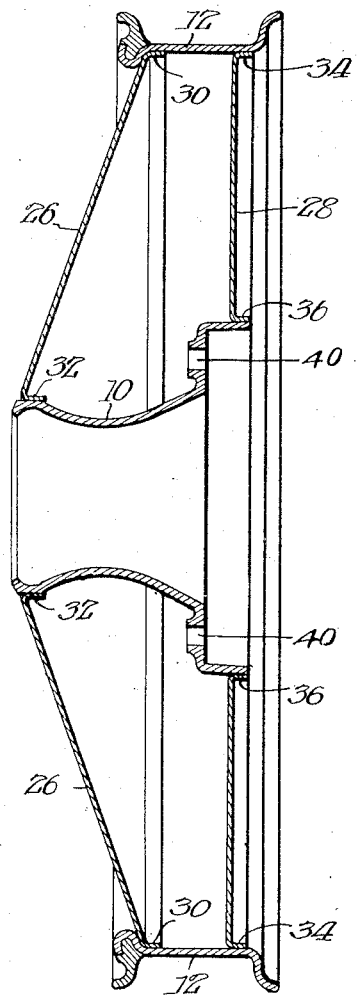

Fig. 2 is a modified structure of Fig. 1, identical with it except that the side disks of the wheel have their flanges reversed in direction.

Referring to the structure of Fig. 1, a suitable hub 10 and a tire carrying rim 12, both without novelty, and of standard form are provided. These parts have placed between them two spaced metallic disks 14 and 16. The disk 14 is provided with flanges 18 and 20, each in specific form shown turned in the same direction in the particular case here illustrated, toward the interior of the box of the wheel. In other words, the disk is channel shaped in cross section. The front disk 16 is of channel cross-section and is similarly provided with flanges 22 and 24 turned in the same direction, both being turned in the same general direction as flanges 18 and 20. In the construction of this wheel the operator first assembles in a suitable holding device, the hub 10, the rim 12 and the disk 13. He then proceeds to weld flange 18 to rim 12 and flange 20 to hub 10. Now, without moving any of the holding parts, he places disk 16 in place and then proceeds to weld the flange 24 to the hub 10 and the flange 22 to the rim 12, the order of these two operations being immaterial. Having done this, the wheel is complete and the operator can remove it from the holding device.

In the structure of Fig. 2 the same hub 10 and rim 12 are provided connected together by two spaced disks 26 and 28, the former corresponding to disk 16 and the latter to disk 14. In this construction the disk 26 has a rim flange 30 and a hub flange 32 turned toward the interior of the box of the wheel, and the disk 28 has a rim flange 34 and a hub flange 36, parallel to each other and outward from the box of the wheel. In constructing the wheel of Fig. 2 the operator proceeds as before, except as to the order of disks which he fastens in. In this case he first assembles hub 10, rim 12, and disk 26, welding flange 30 to the rim and flange 32 to the hub. Now, without moving the wheel, or changing any of the supporting devices, he places disk 28 in position and welds flange 34 to the rim and flange 36 to the hub, whereupon as before, the wheel is complete and ready for any use desired.

It will be noted that in this preferred construction if one disk of either wheel were reversed with reference to the other plate it would be necessary for the operator to turn the wheel over at some stage of the operation in order to weld the flanges of that reversed part. The same is true where a disk with staggered flanges is used.

The standard hub 10 is provided with perforations 40 to engage and be occupied by dowel pins on the hub of the car which carries the wheel. These dowel pins completely fill the holes and so practically exclude air and water at these points.

Having thus described my invention what

I claim as new and desire to secure by Letters Patent, is:—

1. A metallic wheel comprising a hub and inclosing rim, connected together by spaced apart disks welded to the rim and hub, through the agency of flanges on the disks turned parallel respectively to the rim and hub and all pointed in the same direction.

2. A metallic wheel comprising a hub and rim, a disk of channel shaped cross section forming one face of the wheel interposed between the rim and hub, another disk of channel shaped cross section forming the other face of the wheel, the two disks being spaced apart and placed with their flanges all pointing in the same direction, and means making a substantially air tight connection between the flanges of the disks and the rim and hub respectively.

In witness whereof, I have hereunto subscribed my name in the presence of two witnesses.

JAMES A. CHARTER.

Witnesses:
DWIGHT B. CHEEVER,
A. ROSENTHAL.